us010904034B2

United States Patent
Tao et al.

(10) Patent No.: US 10,904,034 B2
(45) Date of Patent: Jan. 26, 2021

(54) FRACTAL TREE STRUCTURE-BASED DATA TRANSMIT DEVICE AND METHOD, CONTROL DEVICE, AND INTELLIGENT CHIP

(71) Applicant: Institute of Computing Technology, Chinese Academy of Sciences, Beijing (CN)

(72) Inventors: Jinhua Tao, Beijing (CN); Tao Luo, Beijing (CN); Shaoli Liu, Beijing (CN); Shijin Zhang, Beijing (CN); Yunji Chen, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 214 days.

(21) Appl. No.: 15/781,608

(22) PCT Filed: Jun. 17, 2016

(86) PCT No.: PCT/CN2016/086093
§ 371 (c)(1),
(2) Date: Jun. 5, 2018

(87) PCT Pub. No.: WO2017/107410
PCT Pub. Date: Jun. 29, 2017

(65) Prior Publication Data
US 2020/0084065 A1 Mar. 12, 2020

(30) Foreign Application Priority Data

Dec. 24, 2015 (CN) .......................... 2015 1 0983306

(51) Int. Cl.
*H04L 12/44* (2006.01)
*H04L 12/761* (2013.01)
*H04L 12/933* (2013.01)

(52) U.S. Cl.
CPC .............. *H04L 12/44* (2013.01); *H04L 45/16* (2013.01); *H04L 49/109* (2013.01)

(58) Field of Classification Search
CPC ......... H04L 12/44; H04L 45/16; H04L 45/20; H04L 45/74; H04L 45/122; H04L 49/25; H04L 49/109
See application file for complete search history.

(56) References Cited

U.S. PATENT DOCUMENTS 7,502,769 B2  3/2009 Nugent
7,769,891 B2 * 8/2010 Arimilli ................ H04L 67/327
                                                370/235
(Continued)

FOREIGN PATENT DOCUMENTS

CN   105046109 A   11/2015
CN   105550157 A   5/2016
(Continued)

OTHER PUBLICATIONS

Li, Jiaxin et al., "Research on Ergodic Property and Streaming Model of Triplet-Based Interconnection Network", Transactions of Beijing Institute of Technology, vol. 30, No. 6, Jun. 30, 2010, 5 pgs.
(Continued)

*Primary Examiner* — Michael Thier
*Assistant Examiner* — Prince A Mensah
(74) *Attorney, Agent, or Firm* — Maschoff Brennan (57) ABSTRACT

One example of a device comprises: a central node that is as a communication data center of a network-on-chip; a plurality of leaf nodes that are as communication data nodes of the network-on-chip and for transmitting the communication data to a central leaf node; forwarder modules for connecting the central node with the plurality of leaf nodes and forwarding the communication data, wherein the plurality of leaf nodes are divided into N groups, each group having the (Continued)

same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels.

14 Claims, 7 Drawing Sheets

(56) References Cited

U.S. PATENT DOCUMENTS

| | | | | |
|---|---|---|---|---|
| 2002/0174207 A1* | 11/2002 | Battou | ................ | G06F 8/65 709/223 |
| 2015/0043575 A1* | 2/2015 | Kumar | ................ | H04L 45/16 370/390 |
| 2017/0227981 A1* | 8/2017 | Yuyama | ................ | G06F 1/06 |

FOREIGN PATENT DOCUMENTS

| | | | |
|---|---|---|---|
| CN | 105630733 A | 6/2016 | |
| CN | 105634960 A | 6/2016 | |

OTHER PUBLICATIONS

International Search Report dated Jun. 29, 2017, in related PCT Application No. PCT/CN2016/086093, 4 pgs.

* cited by examiner

FRACTAL TREE STRUCTURE-BASED DATA TRANSMIT DEVICE AND METHOD, CONTROL DEVICE, AND INTELLIGENT CHIP

TECHNICAL FIELD

The present invention relates to the technical fields of intelligent device, unmanned driving and network-on-chip data transmission, etc., and particularly relates to a fractal tree structure-based data transmit device and method, a control device, and an intelligent chip.

BACKGROUND

Figure 1:
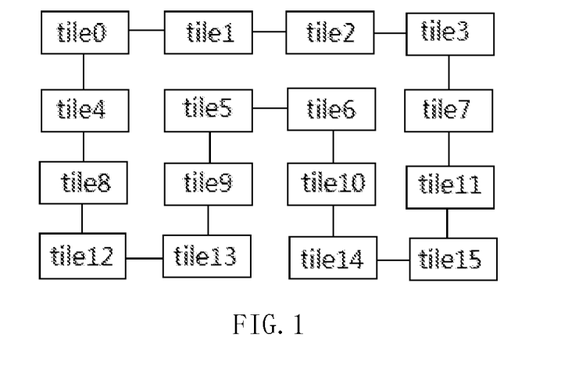
FIG. 1 is a structure diagram of a loop network-on-chip in the prior art.

Broadcast is a way of transmitting data to all devices within a limited range in a network, i.e., a broadcast area; multicast is a way of transmitting data to one or more hosts in a network. The network-on-chip is a novel computer integration based on multi-processor technology, which can be adapted to multiple asynchronous clocks commonly used in current complicated SoC design while acquiring higher bandwidth in concurrent and non-blocking exchange. However, since delay is increased in data packing, buffering, synchronizing and interfacing, broadcast on a chip is different in delay for each core, as shown in FIG. 1, which is a structure diagram of a loop network-on-chip, wherein all tiles are connected to form a loop, and adjacent tiles can directly transmit data, but communication delay of diagonal tiles is longer, causing that delay of data reaching each node is different in broadcasting.

In order to decrease the delay in data packing, buffering, synchronizing and interfacing, data is preferably transmitted in respective nodes in a way of pipeline. Pipeline data transmission means that as soon as a node receives data in a cycle, the node immediately transmits the data to a next node in a next cycle without interruption. If the respective nodes do not follow the same network communication protocol, and lack of cooperation, data streamlines may have data conflict and data loss may occur during an execution of the pipeline data transmission, and data transmission within the chip is not reliable. In a specific embodiment, since a data sender cannot know whether a data receiver has taken the data from a buffer region, it will send the next data to the buffer region of the data receiver, and at this time, the original data is updated by a new data, and will be lost.

The prior art lacks effective support to broadcast and multicast communication modes among multiple cores on the chip. Therefore, it is urgent to provide a synchronous, pipeline and reliable approach supporting the broadcast and multicast communication modes simultaneously.

SUMMARY

With respect to deficiencies of the prior art, the present invention provides and particularly relates to a fractal tree structure-based data transmit device and method, a control device, and an intelligent chip for publishing central data to a cache within a data processing device.

The present invention provides a fractal tree network structure-based data transmit device, comprising:

a central node that is as a communication data center of a network-on-chip and for broadcasting or multicasting communication data to a plurality of leaf nodes;

a plurality of leaf nodes that are as communication data nodes of the network-on-chip and for transmitting the communication data to a central leaf node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder module of multiple levels, a communication structure constituted by each group of leaf nodes has self-similarity, and the plurality of leaf nodes are in communication connection with the central node in a complete multi-way tree approach by means of the forwarder modules of multiple levels.

Each of the leaf nodes comprises a local cache structure for storing a subset of the data publishing by the central node; and each of the leaf nodes has an id identifier which sequentially increases in sequence numbers from one topological side of the complete multi-way tree.

the data transmit device shares a clock signal.

The forwarder modules comprise a local cache structure for storing data.

The present invention further provides a data transmit method of using the data transmit device, the method comprising publishing communication data to a plurality of leaf nodes via a central node, wherein after preparing to send data, a data sender sends a data valid signal, and places the data on a bus; after preparing to receive data, a data receiver sends a data ready-to-receive signal; when the data valid signal and the data ready-to-receive signal are detected, the data sender considers that data has been sent, and received by the data receiver.

When the communication data is broadcasted from the central node to the plurality of leaf nodes, the data is firstly input from the central node into a local cache of the forwarder module in directly connection with the central node via a Handshake Protocol for temporary storage, then input into a local cache of an intermediate forwarder module of the next level for temporary storage after successful of the handshake for each time, and is finally input into forwarder modules in directly connection with the leaf nodes, and published to a group of leaf nodes connected therewith by means of the forwarder modules, respectively.

If the handshake between the data sender and the data receiver is successful in the next clock cycle, the data is input into a local cache of the data receiver in a way of pipeline for storage; if the handshake is not successful, the data is saved in a local cache of current level such that the current level is used as the data receiver of previous level to stop sending a data ready-to-receive signal, such that the data in the local cache of the current level stops updating, and is always saved in the current level till successful of the handshake.

When the central node multicasts communication data to the plurality of leaf nodes, the data is firstly input from the central node into a local cache of the forwarder module in directly connection with the central node via a Handshake Protocol for temporary storage, then input into a local cache of an intermediate forwarder module of the next level for temporary storage after successful of the handshake for each time, and is finally input into the forwarder modules in directly connection with the leaf nodes, and published to a group of leaf nodes connected therewith by means of the forwarder modules, respectively.

When receiving data, the leaf nodes select the data of preset bandwidth according to the id identifiers corresponding thereto.

The present invention further provides a control device comprising the data transmit device.

The present invention further provides an intelligent chip comprising the control device.

DETAILED DESCRIPTION

The present invention provides a fractal tree network structure-based data transmit device, comprising:

a central node that is as a communication data center of a network-on-chip and for broadcasting or multicasting communication data to a plurality of leaf nodes;

a plurality of leaf nodes that are as communication data nodes of the network-on-chip and for transmitting the communication data to a central leaf node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder modules of multiple levels, a communication structure constituted by each group of leaf nodes has self-similarity, and the plurality of leaf nodes are in communication connection with the central node in a complete multi-way tree approach by means of the forwarder modules of multiple levels.

Each of the nodes comprises a local cache structure for storing a subset of the data published by the central node; and each of the leaf nodes has an id identifier which sequentially increases in sequence numbers from one topological side of the complete multi-way tree.

the data transmit device shares a clock signal.

The forwarder modules comprise a local cache structure for storing data.

The present invention further provides a data transmit method of using the data transmit device, the method comprising publishing communication data to a plurality of leaf nodes via a central node, wherein after preparing to send data, a data sender sends a data valid signal, and places the data on a bus; after preparing to receive data, a data receiver sends a data ready-to-receive signal; when the data valid signal and the data ready-to-receive signal are detected, the data sender considers that data has been sent, and received by the data receiver.

When communication data is broadcasted from the central node to the plurality of leaf nodes, the data is firstly input from the central node into a local cache of the forwarder module in directly connection with the central node via a Handshake Protocol for temporary storage, then input into a local cache of an intermediate forwarder module of the next level for temporary storage after successful of the handshake for each time, and is finally input into the forwarder modules in directly connection with the leaf nodes, and published to a group of leaf nodes connected therewith by means of the forwarder modules, respectively.

If the handshake between the data sender and the data receiver is successful in the next clock cycle, the data is input into a local cache of the data receiver in a way of pipeline for storage; if the handshake is not successful, the data is saved in a local cache of current level such that the current level is used as the data receiver of previous level to stop sending a data ready-to-receive signal, such that data in the local cache of the current level stops updating, and is always saved in the current level till successful of the handshake.

When the central node multicasts communication data to the plurality of leaf nodes, the data is firstly input from the central node into a local cache of the forwarder module in directly connection with the central node via a Handshake Protocol for temporary storage, then input into a local cache of an intermediate forwarder module of the next level for temporary storage after successful of the handshake for each time, and is finally input into the forwarder modules in directly connection with the leaf nodes, and published to a group of leaf nodes connected therewith by means of the forwarder modules, respectively.

When receiving data, the leaf nodes select the data of preset bandwidth according to the id identifiers corresponding thereto.

The present invention further provides a control device comprising the data transmit device.

The present invention further provides an intelligent chip comprising the control device.

The present invention is further explained in detail below with reference to the drawings, such that those skilled in the art can carry it out according to the disclosure.

Figure 4:
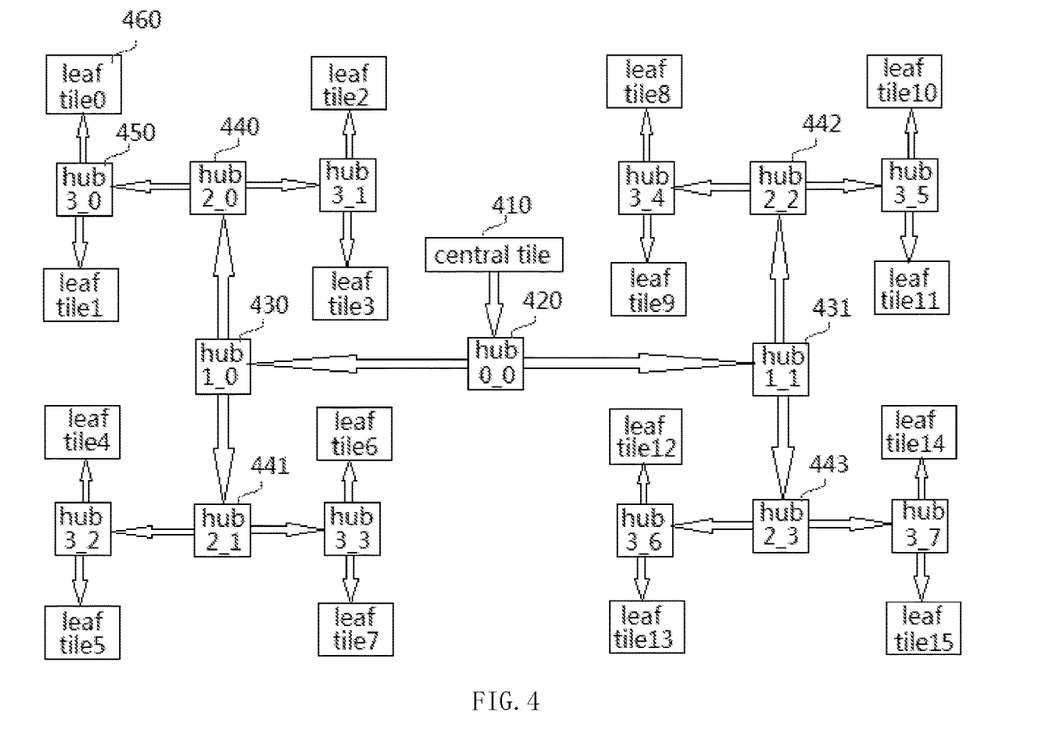
FIG. 4 is a schematic structure diagram of a multicore on chip of 16+1 cores connected using a h-tree in one embodiment of the present invention.

FIG. 4 is a schematic structure diagram of a multicore on chip of 16+1 cores connected using a h-tree in one embodiment of the present invention. A root node of the h-tree is a central tile, which is a start point for publishing data; leaf nodes of the h-tree are leaf tiles, which are end points for publishing data; remaining intermediate nodes are hubs, which are used for transmitting and distributing data.

Sixteen leaf tiles in the figure are divided into eight groups, each group having two leaf tiles. The hubs are individually in communication connection with each group of leaf tiles by means of the forwarder modules of multiple levels, a communication structure constituted by each group of leaf tiles has self-similarity, and the plurality of leaf tiles are in connection with the central tile in a complete binary tree approach by means of the forwarder modules of multiple levels. The device realizes the circumstance of publishing data from a data center to a processing unit in a broadcast or multicast mode.

Figure 2:
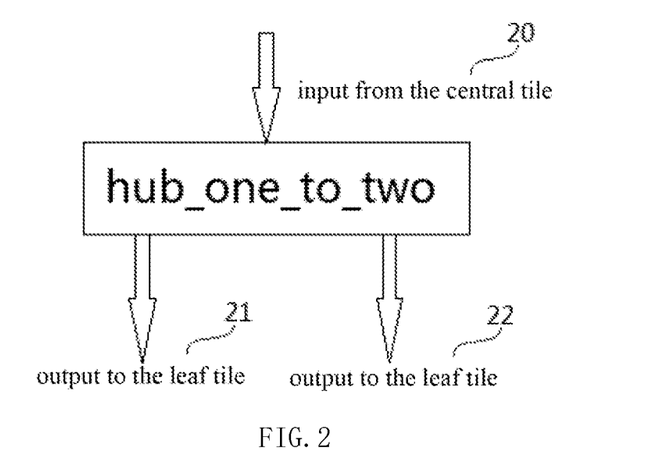
FIG. 2 is a schematic structure diagram of hub_one_to_two in the present invention.

FIG. 2 is a schematic structure diagram of a hub. The hub is consisted of hub_one_to_two modules, and the hub_one_to_two divides a group of input data 20 of full bandwidth into two groups of data 21 and 22 of full bandwidth for outputting, realizing the transmission from the central tile to the leaf tiles.

Figure 3:
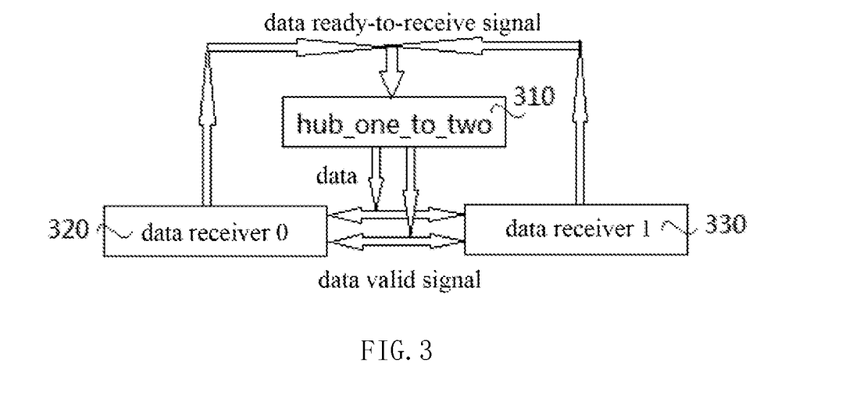
FIG. 3 is a schematic diagram of a handshake action between the hub_one_to_two and the data receiver in the present invention.

As shown in FIG. 3, when the hub_one_to_two module labeled as 310 has transmitted data and a data valid signal to a bus, and a data receiver 0 labeled as 320 and a data receiver 1 labeled as 330 have transmitted a data ready-to-receive signal to the bus, the handshake is successful; in this cycle, 310 considers that the data receivers, i.e., 320 and 330, have received the data, and in the next cycle, 320 and 330 store the data on the bus in this cycle in a buffer region.

As shown in FIG. 4, a central tile labeled as 410 broadcasts data to initialize all leaf tiles. At this time, local caches of all hubs and leaf tiles are empty, data ready-to-receive signals are high logic level, and a data ready-to-receive signal for a hub0_0 labeled as 420 and in directly connection with 410 is also high logic level. In the first cycle, 410 prepares data, and sets its data valid signal to be high logic level. Since the data ready-to-receive signal of the hub0_0 labeled as 420 is high logic level, handshake of 410 and 420 is successful. In the second cycle, 420 stores the data from the bus in a local cache for temporary storage. Since the local cache of 420 has stored with data in the second cycle, it transmits the data and the data valid signal to a bus in a direction of 430 and 431 of next stage. At this time, data ready-to-receive signals of a hub1_0 labeled as 430 and a hub1_1 labeled as 431 are also high logic level, and handshake of 420 and 430, 431 of next level is successful in this cycle. In the third cycle, 430 and 431 store the data from the bus to local caches for temporary storage, with such sequential execution, data is transmitted in each cycle from the previous level to the next level. In this embodiment, taking a branch from the hub1_0 labeled as 430 to a leaf tile0 labeled as 460 for example, in the fourth cycle, the data flows into a local cache of a hub2_0 labeled as 440 for temporary storage; in the fifth cycle, the data flows into a local cache of a hub3_0 labeled as 450 for temporary storage; in the sixth cycle, 450 stores data of full bandwidth in local caches of one group of leaf tiles connected therewith by means of two input ports respectively after the handshake is successful, and at this time, the data reaches the leaf tile0 labeled as 460. Therefore, under the circumstance that a data path is smooth, the pipeline data transmission in accordance with levels is ensured.

Figure 5:
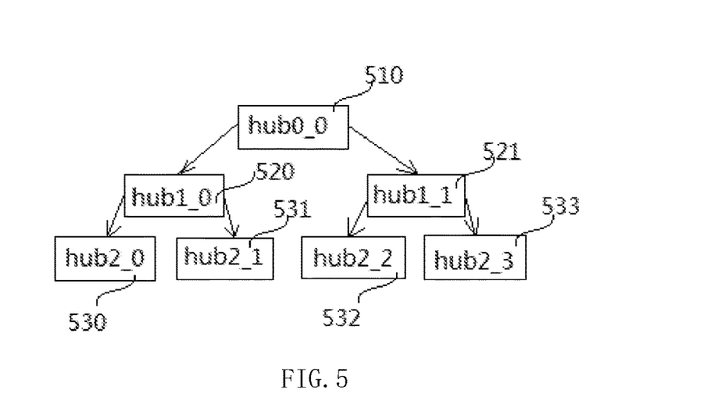
FIG. 5 is a schematic diagram of a transmission action of data in hubs in another embodiment of the present invention.

As shown in FIG. 5, this embodiment takes a hub1_0 for example, a hub1_0 labeled as 520 receives data from a hub0_0 labeled as 510, and 520 places the data and a data valid signal on a bus in a direction of 530 and 531 of next level, data is retained in the hubs if the following condition occurs. Now the condition is set as follows. At this time, a hub2_0 labeled as 530 and a hub2_1 labeled as 531 do not send a data ready-to-receive signal, and such a state is maintained in a later time. Since handshake of 520 and 530, 531 of next level is not successful, data cannot be transmitted from 520 to 530 and 531 of next stage, and is hence retained in a local cache of 520. At this time, 520 cannot send the data ready-to-receive signal, and in a later time, since a local cache of 510 is empty, it can receive new data. However, since 520 does not send the data ready-to-receive signal, causing that handshake of 520 and 510 is not successful, i.e., data cannot be sent from 510 to 520, it ensures safety of data in the local cache of 520, such that reliability of data transmission is achieved.

As shown in FIG. 5, this embodiment takes the hub1_0 for example, the hub1_0 labeled as 520 receives data from the hub0_0 labeled as 510, and 520 places the data and the data valid signal on the bus in the direction of 530 and 531 of next level, the hub can transmit data in a way of pipeline if the following condition occurs. Now the condition is set as follows. At this time, the hub2_0 labeled as 530 and the hub2_1 labeled as 531 send a data ready-to-receive signal, and such a state is maintained in a later time. Since handshake of 520 and 530, 531 of next level is successful, data is transmitted from 520 to 530 and 531 of next stage, and 520 can send the data ready-to-receive signal. If the local cache of 510 has prepared new data, and places the data and the data valid signal on a bus in a direction of 520, in the current cycle, since 520 sends the data ready-to-receive signal, handshake of 510 and 520 is successful; in the second cycle, 520 stores the data transmitted from 510 in the local cache, and places the data and the data valid signal on the bus in the direction of 530 and 531 of next level. As can be seen, under the circumstance that the data path is smooth, i.e., a data source is sufficient, the hub can transmit data in a way of pipeline.

Figure 6:
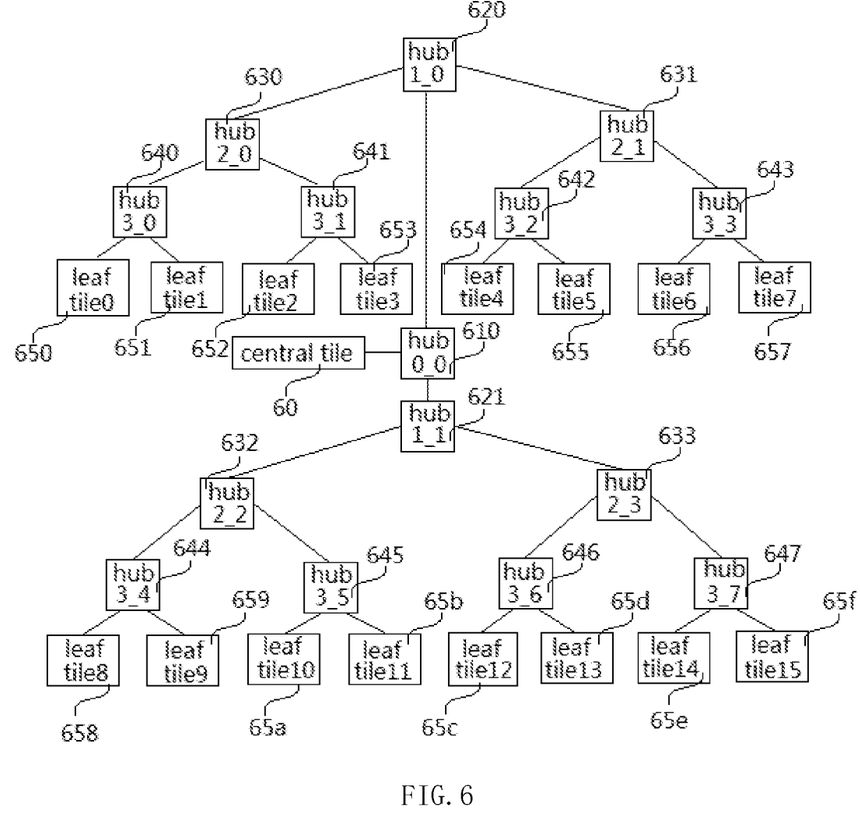
FIG. 6 is a structure diagram of the h-tree structure expanded to a complete binary tree topology in the present invention.

As shown in FIG. 6, supposing that there are sixteen leaf tiles, a h-tree is expanded as a complete binary tree topology. Hubs are non-leaf nodes, and leaf tiles are leaf nodes. The nodes having the same level in the tree sequentially increase in sequence numbers from left to right, and the hubs are named combining the level number with the sequence number. For example, 610 is labeled as hub0_0, i.e., the 0th node on the first level, 620 is labeled as hub1_0, i.e., the 0th node on the second level, and 621 is labeled as hub1_1, i.e., the 1st node on the second level.

As shown in FIG. 6, in this embodiment, a central tile labeled as 60 multicasts data to initialize all leaf tiles. At this time, local caches of all hubs and leaf tiles are empty, data ready-to-receive signals are high logic level, i.e., a data path is smooth, and data is transmitted in a way of pipeline. In the first cycle, handshake of 60 and 610 is successful; in the second cycle, 610 stores the data from the bus in a local cache for temporary storage, and handshake of 610 and 620, 621 of next level is successful in this cycle; in the third cycle, 620 and 621 store the data from the bus in local caches for temporary storage, and handshake of 620 and 630, 631 of next level is successful, and handshake of 621 and 632, 633 of next level is successful in this cycle; in the fourth cycle, 630, 631, 632 and 633 store the data from the bus in local caches for temporary storage, and handshake of 630 and 640, 641 of next level is successful, handshake of 631 and 642, 643 of next level is successful, handshake of 632 and 644, 645 of next level is successful, and handshake of 633 and 646, 647 of next level is successful in this cycle; in the fifth cycle, 640, 641, 642, 643, 644, 645, 646 and 647 store the data from the bus in local caches for temporary storage, and handshake of 640 and 650, 651 of next level is successful, handshake of 641 and 652, 653 of next level is successful, handshake of 642 and 654, 655 of next level is successful, handshake of 643 and 656, 657 of next level is successful, handshake of 644 and 658, 659 of next level is successful, handshake of 645 and 65a, 65b of next level is successful, handshake of 646 and 65c, 65d of next level is successful, and handshake of 647 and 65e, 65f of next level is successful in this cycle; in the sixth cycle, data are stored in local caches of all leaf tiles 650, 651, 652, 653, 654, 655, 656, 657, 658, 659, 65a, 65b, 65c, 56d, 65e and 65f simultaneously. As can be seen, under the circumstance that the data path is smooth, data broadcasted from central to leaf nodes can reach simultaneously, and data synchronism is achieved.

Figure 7:
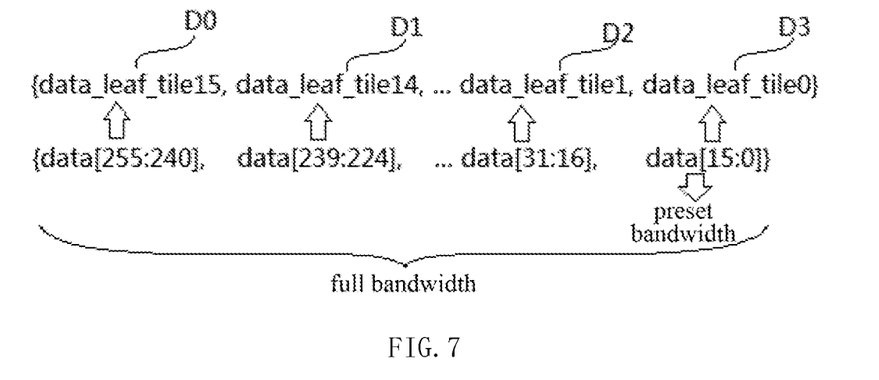
FIG. 7 is a schematic diagram of full bandwidth data and data segment corresponding to each of leaf tiles on the h-tree in another embodiment of the present invention.

In the above embodiment, data are all in full bandwidth when reaching each of the leaf tiles. Supposing that a preset bandwidth of each of the leaf tiles is a 16-bit data, as shown in FIG. 7, multicasting data can be obtained from the data of full bandwidth according to its id sequence number, and a position of the data in full bandwidth is [id*16:id*16+15]. For example, data D0 with an id sequence number of 15 is at data[255:240], and data D0 with an id sequence number of 0 is at data[15:0].

Figure 9:
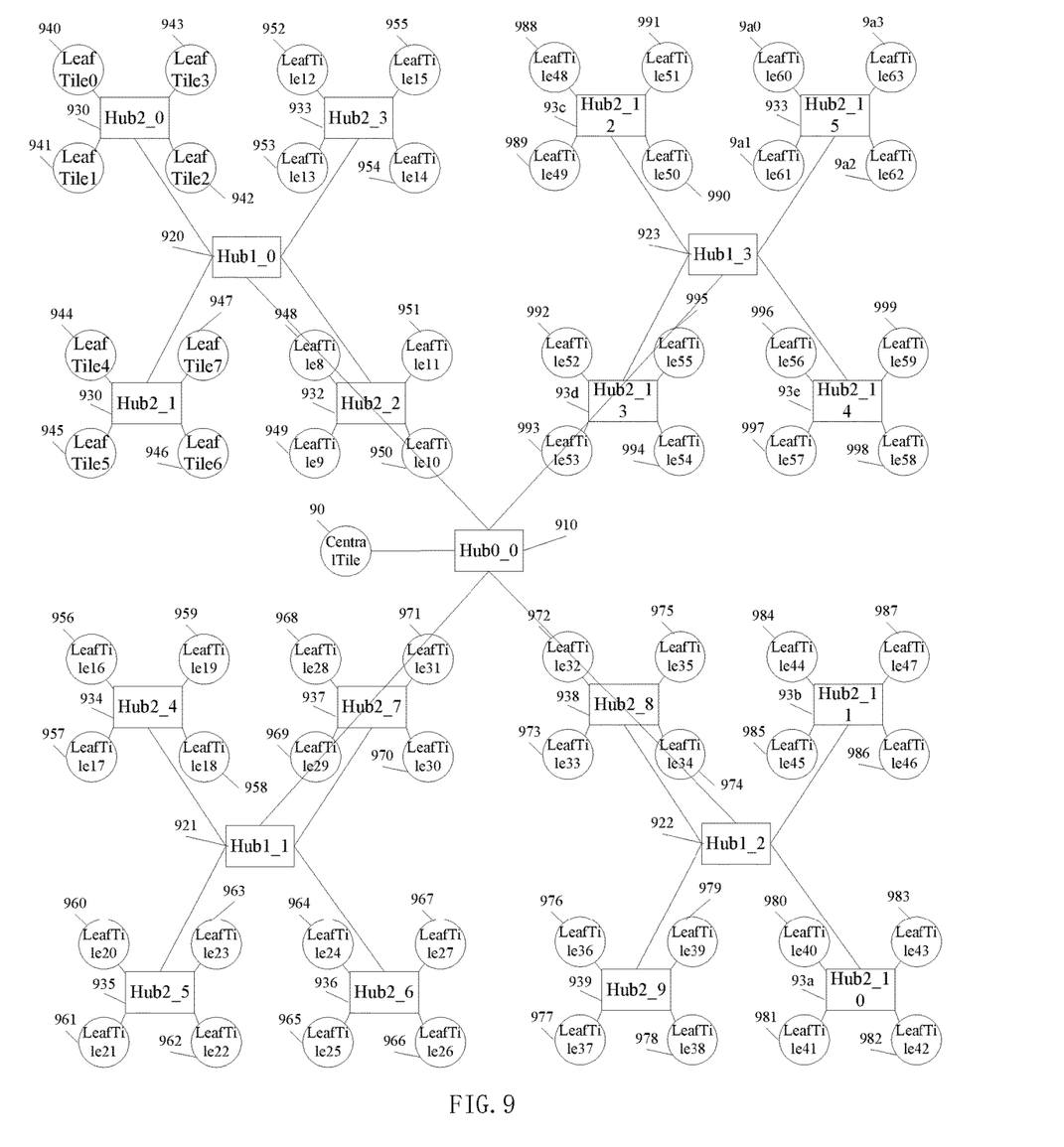
FIG. 9 is a schematic diagram of a transmission action of data in hubs in another embodiment of the present invention.

FIG. 9 is a schematic structure diagram of a multicore on chip of 64+1 cores connected using a x-tree in one embodiment of the present invention. A root node of the x-tree is a central tile, which is a start point for publishing data; leaf nodes of the x-tree are leaf tiles, which are end points for publishing data; remaining intermediate nodes are hubs, which are used for transmitting and distributing data. Sixty-four leaf tiles in the figure are divided into sixteen groups, each group having four leaf titles. The hubs are individually in communication connection with each group of leaf tiles by means of the forwarder module, a communication structure constituted by each group of leaf tiles has self-similarity, and the plurality of leaf tiles are in connection with the central tile in a complete quad-tree approach by means of the forwarder modules of multiple levels. The device realizes the circumstance of publishing data from a data center to a processing unit in a broadcast or multicast mode.

Figure 8:
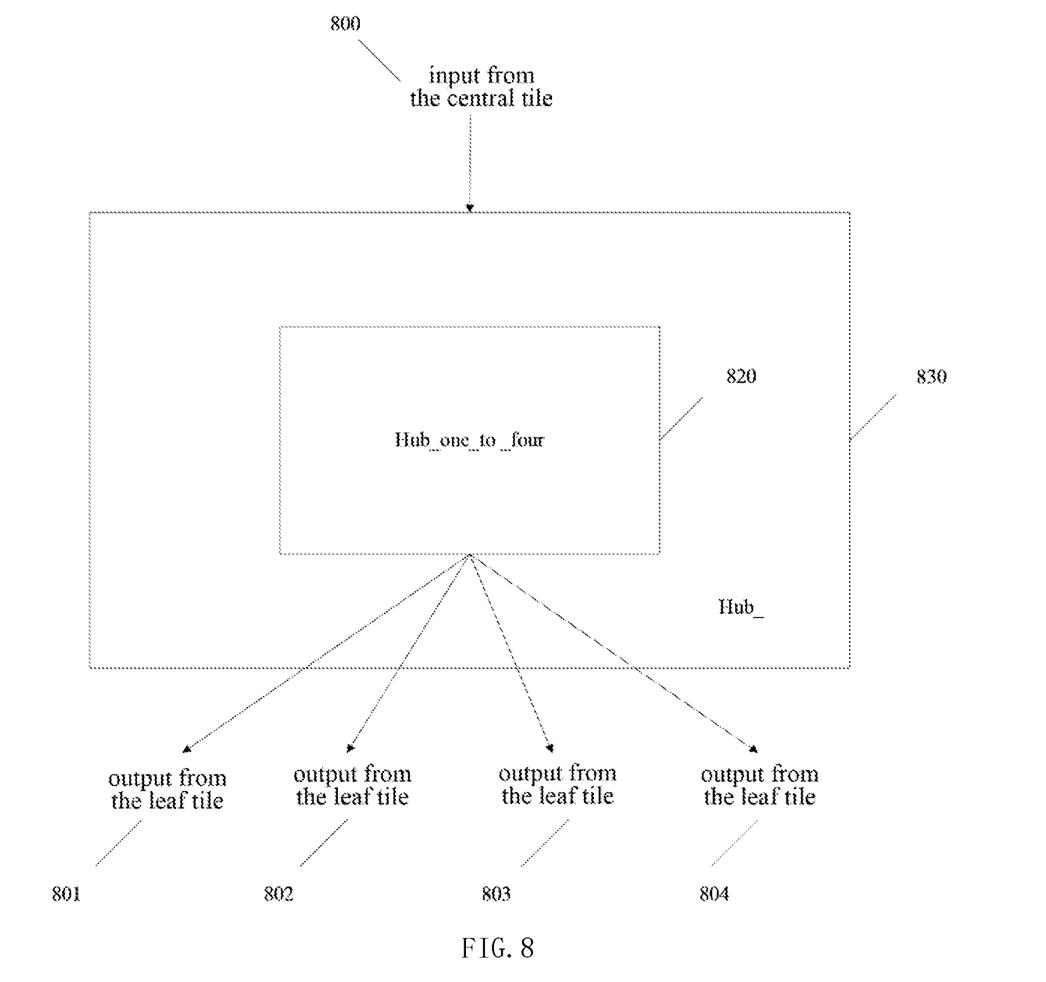
FIG. 8 is a schematic structure diagram of a multicore on chip of 64+1 cores connected using a x-tree in one embodiment of the present invention.

FIG. 8 illustrates a schematic structure diagram of a hub. The hub is consisted of hub_one_to_four modules, and the hub_one_to_four divides a group of input data 800 of full bandwidth into four groups of data 801, 802, 803 and 804 of full bandwidth for outputting, realizing the transmission from the central tile to the leaf tiles.

Figure 10:
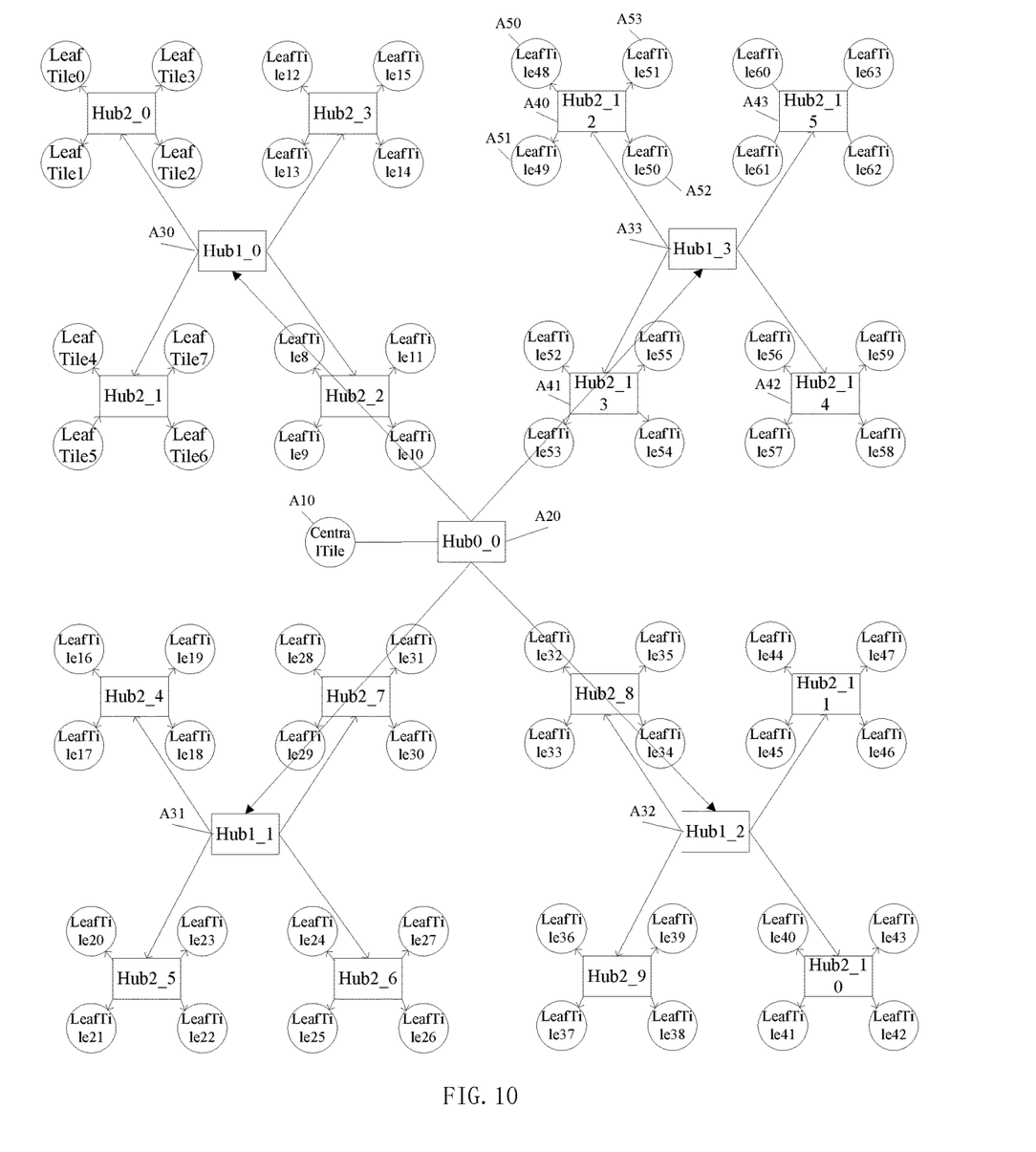
FIG. 10 is a schematic structure diagram of a complete quad-tree topology of the x-tree structure in the present invention.

As shown in FIG. 10, a central tile labeled as A10 broadcasts data to initialize all leaf tiles. At this time, local caches of all hubs and leaf tiles are empty, data ready-to-receive signals are high logic level, and a data ready-to-receive signal of a hub0_0 labeled as A20 and in directly connection with A10 is also high logic level. In the first cycle, A10 prepares data, and sets its data valid signal to be high logic level. Since the data ready-to-receive signal of the hub0_0 labeled as A20 is high logic level, handshake of A10 and A20 is successful. In the second cycle, A20 stores the data from the bus in a local cache for temporary storage. Since the local cache of A20 has stored with data in the second cycle, it transmits the data and the data valid signal to a bus in a direction of A30, A31, A32 and A33 of next stage. At this time, data ready-to-receive signals of a hub1_0 labeled as A30, a hub1_1 labeled as A31, a hub1_2 labeled as A32 and a hub1_3 labeled as A33 are also high logic level, and handshake of A20 and A30, A31, A32, A33 of next level is successful in this cycle. In the third cycle, A30, A31, A32 and A33 store the data from the bus to local caches for temporary storage, with such sequential execution, data is transmitted in each cycle from the previous level to the next level. In this embodiment, taking a branch from the hub1_3 labeled as A33 to a leaf tile48 labeled as A50 for example, in the fourth cycle, the data flows into a local cache of a hub2_12 labeled as A40 for temporary storage; in the fifth cycle, A40 stores the data of full bandwidth in local caches of one group, i.e., four leaf tiles including A50, A51, A52 and A53, connected therewith by means of four input ports respectively after the handshake is successful, and at this time, the data reaches the leaf tile48 labeled as A50. Therefore, under the circumstance that a data path is smooth, the pipeline data transmission in accordance with levels is ensured.

As shown in FIG. 9, supposing that there are sixty-four leaf tiles and one central tile, they are connected as a complete quad-tree topology by means of the x-tree. Hubs are non-leaf nodes, and leaf tiles are leaf nodes. The nodes having the same level in the tree sequentially increase in sequence numbers anticlockwise, and the hubs are named combining with the level number and the sequence number. For example, 910 is labeled as hub0_0, i.e., the 0th node on the first level, 920 is labeled as hub1_0, i.e., the 0th node on the second level, and 921 is labeled as hub1_1, i.e., the 1st node on the second level.

As shown in FIG. 9, in this embodiment, a central tile labeled as 90 multicasts data to initialize all leaf tiles. At this time, local caches of all hubs and leaf tiles are empty, data ready-to-receive signals are high logic level, i.e., a data path is smooth, and data is transmitted in a way of pipeline. In the first cycle, handshake of 90 and 910 is successful; in the second cycle, 910 stores the data from the bus in a local cache for temporary storage, and handshake of 910 and 920, 921, 922, 923 of next level is successful in this cycle; in the third cycle, 920, 921, 922 and 923 store the data from the bus in local caches for temporary storage, and handshake of 920 and 930, 931, 932, 933 of next level is successful, handshake of 921 and 934, 935, 936 and 937 of next level is successful, handshake of 922 and 938, 939, 93a and 93b of next level is successful, and handshake of 923 and 93c, 93d, 93e and 93f of next level is successful in this cycle; in the fourth cycle, 930, 931, 932, 933, 934, 935, 936, 937, 938, 939, 93a, 93b, 93c, 93d, 93e and 93f store the data from the bus in local caches for temporary storage, and handshake of 930 and 940, 941, 942, 943 of next level is successful, handshake of 931 and 944, 645, 946, 947 of next level is successful, handshake of 932 and 948, 949, 950, 951 of next level is successful, handshake of 933 and 952, 953, 954, 955 of next level is successful, handshake of 934 and 956, 957, 958, 959 of next level is successful, handshake of 935 and 960, 961, 962, 963 of next level is successful, handshake of 936 and 964, 965, 966, 967 of next level is successful, handshake of 937 and 968, 969, 970, 971 of next level is successful, handshake of 938 and 972, 973, 974, 975 of next level is successful, handshake of 939 and 976, 977, 978, 979 of next level is successful, handshake of 93a and 980, 981, 982, 983 of next level is successful, handshake of 93b and 984, 985, 986, 987 of next level is successful, handshake of 93c and 988, 989, 990, 991 of next level is successful, handshake of 93d and 992, 993, 994, 995 of next level is successful, handshake of 93e and 996, 997, 998, 999 of next level is successful, and handshake of 93f and 9a0, 9a1, 9a2, 9a3 of next level is successful; in the fifth cycle, data are stored in local caches of all leaf tiles from 940 to 9a3 simultaneously. As can be seen, under the circumstance that the data path is smooth, data broadcasted from central to leaf nodes can reach simultaneously, and data synchronism is achieved.

Figure 11:
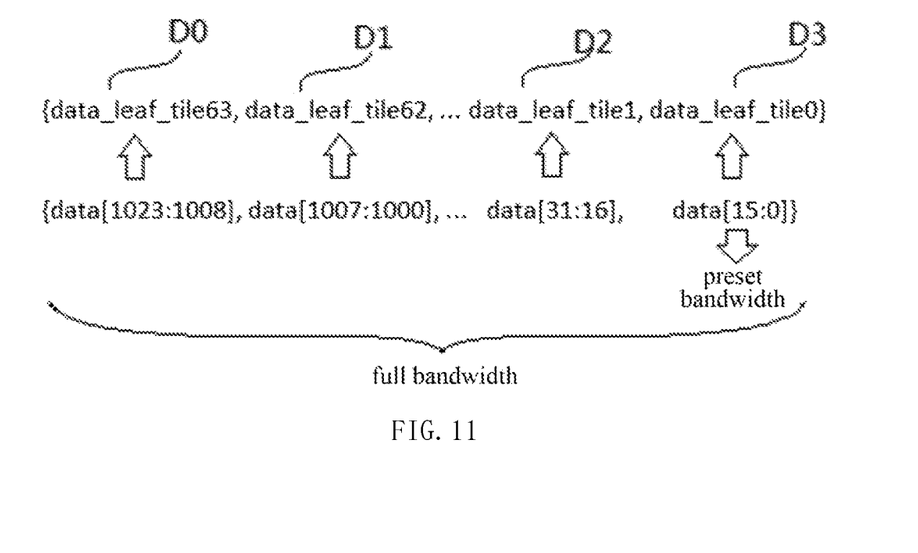
FIG. 11 is a schematic diagram of full bandwidth data and data segment corresponding to each of leaf tiles on the x-tree in another embodiment of the present invention.

In the above embodiment, data are all in full bandwidth when reaching each of the leaf tiles. Supposing that a preset bandwidth of each of the leaf tiles is a 16-bit data, as shown in FIG. 11, multicasting data can be obtained from the data of full bandwidth according to its id sequence number, and a position of the data in full bandwidth is [id*16: id*16+15]. For example, data D0 with an id sequence number of 63 is at data[1023:1008], and data D0 with an id sequence number of 0 is at data[15:0].

INDUSTRIAL APPLICABILITY

The present invention can achieve broadcast and multicast operations on the network-on-chip in a synchronous, pipeline and reliable approach, and improve broadcast communication and multicast communication efficiencies, such that a throughput rate of communication is greatly improved, and data are safely transmitted to respective branch nodes under guarantee of communication protocol to achieve consistency and error free of data, thereby obtaining a better communication effect than the prior art.

What is claimed is:

1. A fractal tree network structure-based data transmit device, comprising:
   a central node that is as a communication data center of a network-on-chip and used for broadcasting or multicasting communication data to a plurality of leaf nodes;
   the plurality of leaf nodes that are as communication data nodes of the network-on-chip and for transmitting the communication data to a central leaf node; and
   forwarder modules for connecting the central node with the plurality of leaf nodes and forwarding the communication data;
   wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels;
   each of the forwarder modules comprises a local cache structure for storing a subset of the data published by the central node; the data transmit device shares a clock signal; when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

2. The fractal tree network structure-based data transmit device according to claim 1, wherein each of the leaf nodes has an id identifier which sequentially increases in sequence numbers from one topological side of the complete multi-way tree.

3. The fractal tree network structure-based data transmit device according to claim 1, wherein the forwarder modules comprise a local cache structure for storing data.

4. A fractal tree network structure-based data transmit method, wherein the data transmit method using a fractal tree network structure-based data transmit device, the data transmit device comprising:
   a central node that is as a communication data center of a network-on-chip and used for broadcasting or multicasting communication data to a plurality of leaf nodes;
   the plurality of leaf nodes that are as communication data nodes of the network-on-chip and for transmitting the communication data to a central leaf node; and
   forwarder modules for connecting the central node with the plurality of leaf nodes and forwarding the communication data,
   wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels,
   the data transmit method comprising publishing communication data to a plurality of leaf nodes via the central node, wherein the central node is the data sender, the leaf nodes are data receivers, and the forwarder modules are both of the data receivers and the data senders, after preparing to send data, the data sender sends a data valid signal, and places the data on a bus; after preparing to receive data, a data receiver sends a data ready-to-receive signal; when the data valid signal and the data ready-to-receive signal are detected, the data sender considers that data has been sent, and received by the data receiver;
   when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

5. The data transmit method according to claim 4, wherein, if the handshake between the data sender and the data receiver is successful in the next clock cycle, the data is input into a local cache of the data receiver in a way of pipeline for storage; if the handshake is not successful, the data is saved in a local cache of current level such that the current level is used as the data receiver of previous level to stop sending a data ready-to-receive signal, such that data in the local cache of the current level stops updating, and is always saved in the current level till successful of the handshake.

6. The data transmit method according to claim 4, wherein, when receiving data, the leaf nodes select the data of preset bandwidth according to the id identifiers corresponding thereto.

7. A fractal tree network structure-based data transmit method, wherein the data transmit method using a fractal tree network structure-based data transmit device, the data transmit device comprising:
   a central node that is as a communication data center of a network-on-chip and used for broadcasting or multicasting communication data to a plurality of leaf nodes;
   the plurality of leaf nodes that are as communication data nodes of the network-on-chip and for transmitting the communication data to a central leaf node; and
   forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels, each of the forwarder modules comprises a local cache structure for storing a subset of the data published by the central node;

each of the leaf nodes has an id identifier which sequentially increases in sequence numbers from one topological side of the complete multi-way tree;

the data transmit device shares a clock signal, the data transmit method comprising publishing communication data to the plurality of leaf nodes via the central node, wherein the central node is the data sender, the leaf nodes are data receivers, and the forwarder modules are both of the data receivers and the data senders, after preparing to send data, the sender sends a data valid signal, and places the data on a bus; after preparing to receive data, a data receiver sends a data ready-to-receive signal; when the data valid signal and the data ready-to-receive signal are detected, the data sender considers that data has been sent, and received by the data receiver;

when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

8. The data transmit method according to claim 7, wherein, if the handshake between the data sender and the data receiver is successful in the next clock cycle, the data is input into a local cache of the data receiver in a way of pipeline for storage; if the handshake is not successful, the data is saved in a local cache of current level such that the current level is used as the data receiver of previous level to stop sending a data ready-to-receive signal, such that data in the local cache of the current level stops updating, and is always saved in the current level till successful of the handshake.

9. The data transmit method according to claim 7, wherein, when receiving data, the leaf nodes select the data of preset bandwidth according to the id identifiers corresponding thereto.

10. A fractal tree network structure-based data transmit method, wherein the data transmit method using a fractal tree network structure-based data transmit device, the fractal tree network structure-based data transmit device comprising:

a central node that is as a communication data center of a network-on-chip and used for broadcasting or multicasting communication data to a plurality of leaf nodes;

the plurality of leaf nodes that are as communication data nodes of the network-on-chip and for transmitting the communication data to a central leaf node; and forwarder modules comprise a local cache structure for storing data, the forwarder modules are connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels, the data transmit method comprising publishing communication data to the plurality of leaf nodes via the central node, wherein the central node is the data sender, the leaf nodes are data receivers, and the forwarder modules are both of the data receivers and the data senders, after preparing to send data, the sender sends a data valid signal, and places the data on a bus; after preparing to receive data, a data receiver sends a data ready-to-receive signal; when the data valid signal and the data ready-to-receive signal are detected, the data sender considers that data has been sent, and received by the data receiver;

when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

11. The data transmit method according to claim 10, wherein, if the handshake between the data sender and the data receiver is successful in the next clock cycle, the data is input into a local cache of the data receiver in a way of pipeline for storage; if the handshake is not successful, the data is saved in a local cache of current level such that the current level is used as the data receiver of previous level to stop sending a data ready-to-receive signal, such that data in the local cache of the current level stops updating, and is always saved in the current level till successful of the handshake.

12. The data transmit method according to claim 10, wherein, when receiving data, the leaf nodes select the data of preset bandwidth according to the id identifiers corresponding thereto.

13. A control device comprising a fractal tree network structure-based data transmit device, wherein the fractal tree network structure-based data transmit device comprises:

a central node that is as a communication data center of a network-on-chip and used for broadcasting or multicasting communication data to a plurality of leaf nodes;

the plurality of leaf nodes that are as communication data nodes of the network-on-chip and for transmitting the communication data to a central leaf node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels;

each of the forwarder modules comprises a local cache structure for storing a subset of the data published by the central node; when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

14. An intelligent chip comprising a control device, the control device comprising a fractal tree network structure-based data transmit device, wherein the fractal tree network structure-based data transmit device comprises:

a central node that is as a communication data center of a network-on-chip and used for broadcasting or multicasting communication data to a plurality of leaf nodes;

the plurality of leaf nodes that are as communication data nodes of the network-on-chip and for transmitting the communication data to a central leaf node; and forwarder modules for connecting the central node with the plurality of leaf nodes and forwarding the communication data, wherein the plurality of leaf nodes are divided into N groups, each group having the same number of leaf nodes, the central node is individually in communication connection with each group of leaf nodes by means of the forwarder module, a communication structure constituted by each group of leaf nodes has self-similarity, and the plurality of leaf nodes are in communication connection with the central node in a complete multi-way tree approach by means of the forwarder modules of multiple levels;

each of the forwarder modules comprises a local cache structure for storing a subset of the data published by the central node; when the communication data is broadcasted or multicasted from the central node to the plurality of leaf nodes, the data is firstly input from the central node into a local cache structure of the forwarder module in direct connection with the central node via a Handshake Protocol for temporary storage, then input into a local cache structure of an intermediate forwarder module of the next level for temporary storage after successful of the handshake for each time, and is finally input into forwarder modules in direct connection with the leaf nodes, and published to a group of leaf nodes connected therewith by means of the forwarder modules, respectively.

\* \* \* \* \*